United States Patent [19]

Tsigadas

[11] Patent Number: 4,809,890
[45] Date of Patent: Mar. 7, 1989

[54] BAR MOUNTED CARRIER FOR BICYCLE

[76] Inventor: Bennet R. Tsigadas, 34, Sunnydale, Dollars-des-Ormeaux, Qc, Canada, H9B 1E2

[21] Appl. No.: 121,084

[22] Filed: Nov. 16, 1987

[51] Int. Cl.⁴ .............................................. B62J 9/00
[52] U.S. Cl. ................................... 224/32 R; 224/35; 248/553; 70/63
[58] Field of Search ...................... 224/30 R, 32 R, 35, 224/36, 39, 41, 281; 220/85 H; 248/553, 551; 70/63; 280/289 A, 289 R

[56] References Cited

U.S. PATENT DOCUMENTS

| | | | |
|---|---|---|---|
| 582,048 | 5/1897 | Eigenraug, Jr. | 224/35 |
| 604,988 | 5/1898 | Knopping | 224/35 |
| 4,193,525 | 3/1980 | Sommers | 224/35 |
| 4,266,703 | 5/1981 | Litz | 248/553 |
| 4,468,939 | 9/1984 | Olshausen | 70/63 |
| 4,469,345 | 9/1984 | Weiss | 224/32 R |

*Primary Examiner*—Henry J. Recla
*Assistant Examiner*—Linda J. Sholl
*Attorney, Agent, or Firm*—Roland L. Morneau

[57] ABSTRACT

A security box adapted to be mounted on a bicycle bar comprises a tubular container slidably mounted in a sleeve member. The container has a sliding cover at one end which locks by a tongue arrangement which engages the container per se. The container has a pin retractably projecting through its periphery and adapted to penetrate into a recess in the sleeve member. The pin can be retracted from the recess only from the inside of the container. The sleeve member which is fastened to the bicycle bar cannot be unfastened when the container is in the sleeve member.

8 Claims, 2 Drawing Sheets

BAR MOUNTED CARRIER FOR BICYCLE

BACKGROUND OF THE INVENTION

1. Field of the Invention

This invention relates to containers and more particularly to a receptacle for securely storing valuables such as wallets, tools or the like, which is designed to be mounted on a bicycle frame and can be easily removed when not in use.

2. Prior Art

Previous art shows numerous types of bags and other devices attached to a bicycle frame and used to carry various objects as examplified by U.S. Pat. No. 4,226,703. However, these devices offer minimal resistance to theft. Indeed, one could not lock his bicycle and expect to prevent attached luggages from being stolen. The user of previous known devices had to remove the device or its content from the bicycle frame and carry it with him whenever the bicycle was left unattended in a potentially vulnerable area. This applies to U.S. Pat. No. 4,193,525.

SUMMARY OF THE INVENTION

Accordingly it is an object of the present invention to provide a security box which when mounted on a bicycle frame allows the user to safely store personal valuables.

This objective is achieved by providing a device composed of a sleeve member and a container which can be slidably inserted into the sleeve. The sleeve member is fixed to the bicycle frame by fastening means which are only vulnerable when the container is removed from the sleeve. The container itself comprises a hollow receptacle which can be securely closed by a locking cover. A pin type device which can only be accessed from the inside of the container, when the cover is removed allows releasable locking action between the container and the sleeve.

DESCRIPTION OF THE PREFERRED EMBODIMENT

Figure 1:
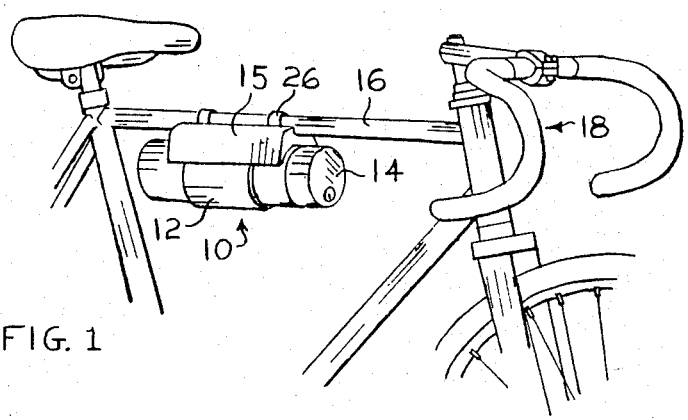
FIG. 1 is a partial perspective view of the security box clamped on a bicycle.

Referring to the drawings, the security box according to the invention is indicated generally by the reference numeral 10. The security box 10 comprises a sleeve member 12 and a tubular container 14. Sleeve member 12 is made of a single piece or of two separate parts rigidly connected together by sutiable fastening means such as screws 17. Sleeve member 12 includes connecting member 15 used to link a bar 16 of a bicycle frame 18 to a cylindrical supporting component 20 which holds a tubular container 14. Connecting member 15 is provided by a first groove 22 dimensioned to partially embrace bar 16 and a second groove 24, which partially follows the contour of cylindrical component 20.

Fastening devices such as conventionally known U-clamps 26 inserted into holes 27 are used to rigidly secure connecting member 15 to bar 16 of bicycle frame 18. They are positioned so that their threaded ends 28 and tightening nuts 30 are inside semi-circular indentation 19 and therefore unaccessible whenever the tubular container 14 is inserted into supporting component 20. The tubular container 14 is adapted to be closed by a cover 32 at its opened end 34.

A locking device 36 such as conventionally known tongue and groove lock is used to retain the cover 32 on the tubular container 14. The protruding skirt 37 around the end of the tubular container 14 slidingly support the cover 32. A slot 38 is provided in the skirt 37 to receive pivotal tongue 40 of the locking device 36. The skirt 37 is also provided with a V-shaped indentation 42 cut through its outer edge.

The V-shaped indentation 42 used in conjunction with V-shaped protuberance 44 situated inside cover 32 of the container 14 to provides a guiding action during the insertion of the cover 32 on the skirt 37. It helps positioning cover 32 so that the slot 38 is located in a proper position to receive the tongue 40 of locking device 36 when the locking action is initiated. The tubular container 14 is more specifically shown in FIG. 4 and includes a first tubular shaped receptacle 46 fixed into a second larger receptacle 48.

Figure 3:
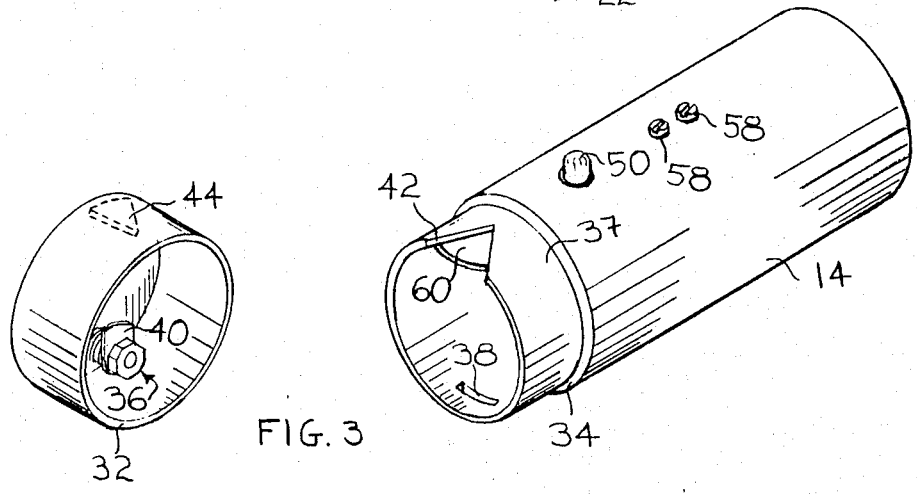
FIG. 3 is a perspective view of the container part of the security box with its cover removed.

The first receptacle 46 is longer than the second receptacle 48. The part of receptacle 46 longitudinally exceeding from receptacle 48 is identified in FIG. 3 by the protruding skirt 37.

Figure 4:
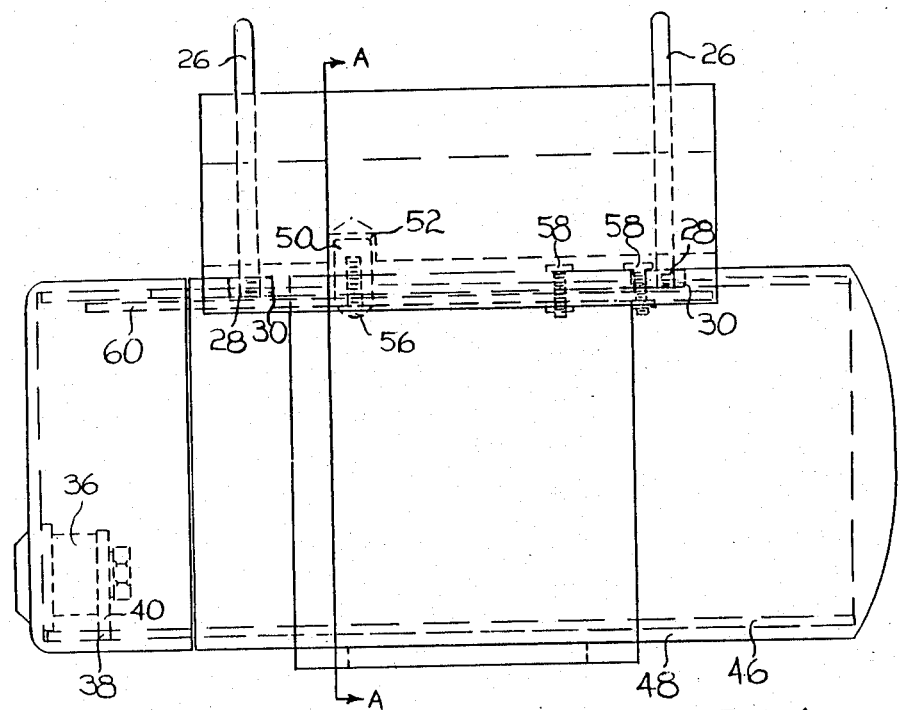
FIG. 4 is an elevation view of the security box and the clamp means with the container inserted in the sleeve and, FIG. 5 is a cross-sectional view of the sleeve part taken along line A—A of FIG. 4.
Figure 5:
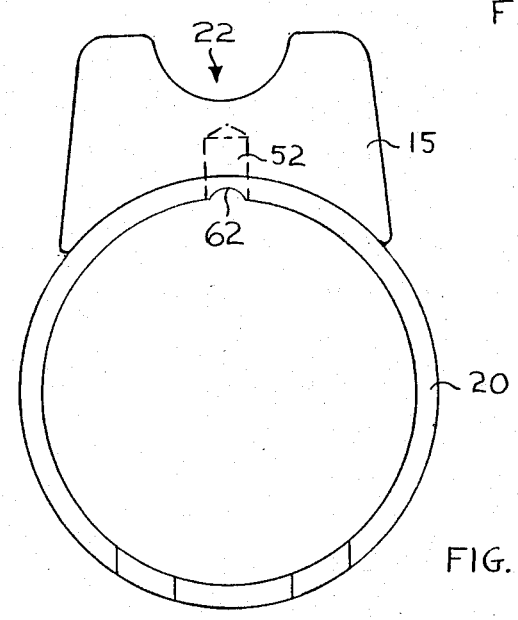

As illustrated in FIG. 4, the outer diameter of the skirt 37 and of the corresponding receptacle 46 matches the inner diameter of receptacle 48 and of the cover 32 to provides a tight fit therebetween and consequently a safe connection.

A retractable pin 50 is slidingly mounted in a radial direction through the peripheral wall of receptacles 46 and 48. The pin 50 is used to provide a releasable locking action between the container 14 and sleeve member 12 and to prevent container 14 from sliding out of sleeve 12.

When in the locked position, pin 50 is inserted in a recess 52 inside the sleeve member 12. The pin 50 is rigidly attached to an elongated arm member 54 which allows retraction of the pin 50 from the opening 52. The arm member 54 is made of a relatively elastic material to which is fastened the pin 50 by a screw 56.

The elongated arm member 54 is fixed at one end to the peripheral wall of receptacles 46 and 48 by one or more screws 58 and positioned so that the tongue 60 at the other end of the arm member 54 extends under V-shaped indentation 42. The user can therefore readily acess arm member 54 and induce retraction of pin 50 by pressing down on the tongue 60.

Figure 2:
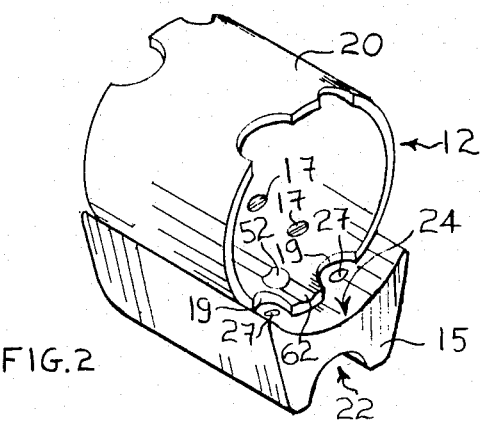
FIG. 2 is an upside down perspective view of the sleeve part of the security box.

The interior peripheral wall of cylindrical supporting component 20 is provided with an axial groove or furrow 62 as shown in FIG. 2. The groove 62 is used in conjunction with screws 58 (FIG. 3) to provide a guiding action so that when the container 14 is inserted into sleeve member 12, the pin 50 will be angularly positioned to snap into the recess 52.

In operation, the sleeve member 12 is permanently mounted on the bicycle bar 16 by fastening the threaded ends of the clamps 26 with the nuts 30 which are located in the semi-circular indentations 19. The objects to be protected are inserted inside the opened container 14. The latter is then closed with the cover 32 and locked with the locking device 36. The cover 32 slides over the skirt 37 in its correct angular orientation when the protuberance 44 is aligned with the indentation 42. This correct alignment automatically aligns the tongue 40 with the slot 38 through which it is inserted when locked. The container 14 is then pushed through the cylindrical component 20 by aligning the screws 58 and the pin 50 with the axial groove 62. When the pin 50 reaches the recess 52, it penetrates in it and locks the axial displacement of the container 14. The latter cannot be removed without the key and because the container 14 hides the nuts 30, the sleeve member 12 cannot be unfastened from the bar 16 of the bicycle. When the user wants access to the hidden objects, he unlocks and removes the cover 32.

If he wants to remove the container 14 from the sleeve 12, he depresses the tongue 60. The pin 50 slides out of the recess 52 to allow axial freedom to the container 14.

Although the pin 50 has been shown to be mounted in the container 14 and to emerge through its periphery so as to penetrate into a recess located in the sleeve member 12, it should be obvious that a corresponding pin could be mounted in the sleeve member and adapted by means of a spring, to retractably project into a hole in the periphery of the container 14. With this arrangement, the pin could be retracted from the hole, by introducing a finger in the container and pushing against the pin until it is retracted inside the sleeve member.

It is also within the embodiment of the invention, to use a lock 36 provided with a retractable pin. Such pin could simultaneously lock the cover 32 on the tubular container 14 and project through the container 14 such as pin 50 to prevent the retraction of the container 14 from the sleeve member 12.

I claim:

1. A security box adapted to be mounted on the bar of a bicycle comprising: a sleeve member and clamp means for supporting said sleeve member on a bicycle bar, a tubular container slidably fitting in said sleeve member, said tubular container having a cover at one end for opening said tubular member, a lock for closing said cover on said tubular container, a retractable pin slidably mounted through said sleeve member and said tubular container for stopping the sliding movement of said tubular container, means for retracting said pin from inside said tubular container, the retraction of said pin allowing the removal of said tubular container inside said sleeve member.

2. A security box as recited in claim 1, wherein said pin in slidingly mounted through the periphery wall of said container, a spring mounted arm member axially fixed inside said tubular container, said arm member being connected to said pin and adapted to resiliently slide said pin in said peripheral wall, said sleeve being provided with an internal recess to receive said pin when said container is mounted in said sleeve whereby said arm member is adapted to retract said pin from said recess to allow retraction of said container from said sleeve.

3. A security box as recited in claim 1, wherein said pin in springly mounted in said sleeve and project outside the latter, said container having a hole in said peripheral wall for receiving said pin and slidingly locking said container in said sleeve, the peripheral wall of said container being provided with an axial groove extending from one end of the container to said hole, the said groove adapted to receive said pin and guide it till it enter said hole when the container is slidingly pushed in said sleeve member.

4. A security box as recited in claim 1, wherein said cover slidingly fits over said one end of said container, said lock mounted on said cover has an actuatable tongue inside said cover adapted to engage said container for locking said cover on said said container.

5. A security box as recited in claim 2, wherein said sleeve member is provided with an internal axial furrow and the sleeve member is provided with guide means projecting on its periphery adapted to engage said axial furrow, the said guide means being located relative said axial furrow to align said pin with said internal recess.

6. A security box as recited in claim 2, wherein said one end of said container has V-shaped indentation cut through the edge thereof, said cover being provided with a V-shaped protuberance adapted to fit into said indentation, the said one end of said container being also provided with a slot in its peripheral surface, said slot being adapted to receive the said tongue when said protuberance fits into said indentation.

7. A security box as recited in claim 6, wherein said sleeve member and the tubular container are cylindrical.

8. A security box as recited in claim 1, wherein said clamp means comprises a pair of U-shaped clamps and tightening means for said clamps located through said sleeve member, whereby said fastening means are obstructed by said tubular container when located inside said sleeve member.

* * * * *